H. AND J. HOFFER.
HOLLOW CASTING.
APPLICATION FILED APR. 23, 1921.

1,394,553.  Patented Oct. 25, 1921.

Inventor:
Herman Hoffer, Jacob Hoffer,
By their Attorney,
Geo. W. Miatt

UNITED STATES PATENT OFFICE.

HERMAN HOFFER AND JACOB HOFFER, OF NEW YORK, N. Y.

HOLLOW CASTING.

1,394,553.

Specification of Letters Patent.  Patented Oct. 25, 1921.

Application filed April 23, 1921. Serial No. 463,865.

*To all whom it may concern:*

Be it known that we, HERMAN HOFFER, a citizen of the United States, and a resident of the borough and county of Bronx, city and State of New York, and JACOB HOFFER, a citizen of Poland, having declared my intention of becoming a citizen of the United States, and a resident of the borough and county of Bronx, city and State of New York, have invented certain new and useful Improvements in Hollow Castings, of which the following is a specification.

Our improvements relate to the manufacture of artificial fruit and analogous hollow objects from plastic material, and are designed to simplify and cheapen the process, and to attain a product superior in strength and durability, our invention consisting essentially in forming the object by molding a plastic composition around a hollow reinforcing core of suitable material upon which the casting sets and hardens, as hereinafter fully set forth.

In the accompanying drawings.

Figure 1:
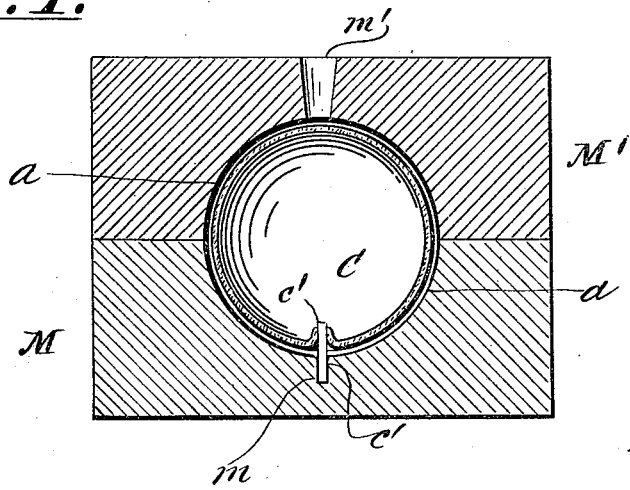
Figure 1, is a central vertical section of a mold adapted to the formation of our improved article of manufacture.
Figure 2:
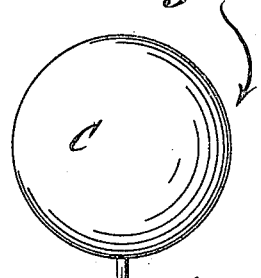
Fig. 2, is an elevation of the core, before insertion in the mold.
Figure 3:
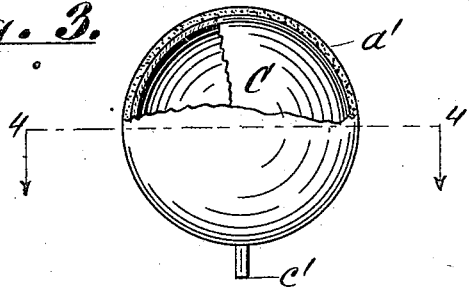
Fig. 3, is an elevation of the product broken away in part to show the interior structure.
Figure 4:
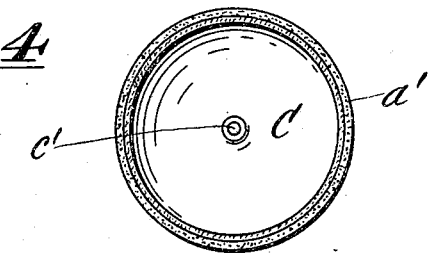
Fig. 4, is a section taken upon plane of line 4—4, Fig. 3.

For convenience of illustration and exemplification we have herein shown our new product as of plain globular form, it being understood of course that the configuration may be such as to represent various fruits and objects which it is desired to reproduce in artificial semblance to the originals. In any case the core C, approximates the size and shape of the article to be reproduced, allowance being made for the thickness of the composition to be imposed thereon.

The core C, is preferably although not necessarily made of papier-mâché, or analogous relatively light weight but tough and tenacious material adapted to the purpose; and is formed with a stem $c'$, for insertion in a socket $m$, provided for the purpose in the lower half or base M, of the mold, the other or upper half M', of said mold being formed with a funnel or pouring hole $m'$, through which the plastic composition in liquid form is introduced into the mold.

The stem $c'$, centralizes and supports the core C, in such manner that a peripheral space $a$, is formed between the exterior surface of the core C, and the opposed inner surfaces of the mold, and this circumscribing space represents the thickness $a'$, of the composition or casting around the core C, in the completed article.

The plastic composition used for the superficial casting on the core C, is preferably similar to that set forth in our concurrent application Serial No. 434,398, filed Dec. 31, 1920; and our present invention is an improvement on the method of manufacture set forth in our concurrent application Serial No. 441,569, filed Feb. 1, 1921.

One advantage we attain by our present invention is the dispensing with the necessity for rotating the mold to distribute the plastic material around the inner surface of the mold for the purpose of causing it to congeal thereon, which is a material and important saving in time and labor.

Another important advantage attained is that our core reinforces and sustains the exterior layer or coating of composition to such an extent that the product may be handled with impunity, and without danger of breakage if ordinary care is used,—the homogeneous, tough and tenacious material used in the formation of the core C, insuring the integrity of the structure even though subjected to considerable extraneous pressure. In fact the product may be allowed to fall several feet without danger of rupture on account of the inherent elasticity and strength of the core. Furthermore, for a like reason, a relatively thin layer of plastic composition will suffice to effect the requisite peripheral coating, thereby attaining and combining economy of production with lightness of weight and a maximum degree of strength and durability.

While we do not wish to limit ourselves exactly to the ingredients or proportions thereof named, we have found that a plastic composition consisting essentially of approximately ten per cent. of vegetable wax added to the greater bulk of paraffin forms an agglomerate well adapted for our purpose of coating our formative core superficially. This composition, when rendered plastic by heat, may be readily poured and molded around the core of fibrous material, and adheres thereto tenaciously, constituting therewith a unitary structure well adapted to subsequent treatment and use for the purposes designated.

In carrying out our new method of manufacture, the stem c, of the core C, performs an important function in centralizing the latter in the mold, and is utilized thereafter as an essential part of the product.

The core C, while preferably made of fibrous or textile material, may even be made of relatively thin metal, or a metallic alloy, without departing from the spirit and intent of our invention in this respect.

The concave surface of the matrix may be moistened before introduction of the plastic material to prevent superficial adhesion, so that the cold shell or casting can be readily removed from the mold.

The internally reinforced casting thus formed, after removal from the mold, may be buffed or otherwise treated for the removal of mold marks and then colored or shaded superficially, after which it may be coated with wax, preferably applied by dipping in a heated liquid bath thereof, to protect the coloring and impart a natural gloss finish to the product.

What we claim as our invention and desire to secure by Letters Patent is,

1. As an article of manufacture, an artificial product of the character designated, comprising a hollow core of fibrous material on which is imposed a casting of plastic composition of wax and paraffin, for the purpose described.

2. As an article of manufacture, an artificial product of the character designated, comprising a pre-formed hollow core of papier-mâché on which is imposed a casting of plastic composition of wax and paraffin, for the purpose described.

3. As an article of manufacture, an artificial product of the character designated comprising a hollow core formed with a centralizing stem and a casting of plastic material imposed on said core, for the purpose described.

HERMAN HOFFER.
JACOB HOFFER.

Witnesses:
DOROTHY MIATT,
GEO. WM. MIATT.